(12) United States Patent
Cook

(10) Patent No.: US 11,268,860 B2
(45) Date of Patent: Mar. 8, 2022

(54) RADIOMETRIC CALIBRATION OF DETECTOR

(71) Applicant: Raytheon Company, Waltham, MA (US)

(72) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/938,797

(22) Filed: Jul. 24, 2020

(65) Prior Publication Data

US 2022/0026280 A1    Jan. 27, 2022

(51) Int. Cl.
| | | |
|---|---|---|
| *G01J 5/54* | (2006.01) | |
| *G01J 5/0806* | (2022.01) | |
| *G01J 5/08* | (2022.01) | |
| *G01S 19/23* | (2010.01) | |
| *G01J 5/00* | (2022.01) | |
| *G01J 5/52* | (2022.01) | |

(52) U.S. Cl.
CPC ............ *G01J 5/0806* (2013.01); *G01J 5/084* (2013.01); *G01S 19/235* (2013.01); *G01J 2005/0048* (2013.01); *G01J 2005/0077* (2013.01); *G01J 2005/528* (2013.01)

(58) Field of Classification Search
CPC .................. G01J 2005/528; G01J 2005/0077
See application file for complete search history.

(56) References Cited

U.S. PATENT DOCUMENTS

| | | |
|---|---|---|
| 4,195,915 A | 4/1980 | Lichty et al. |
| 4,218,111 A | 8/1980 | Withrington et al. |
| 4,265,510 A | 5/1981 | Cook |
| 4,433,924 A * | 2/1984 | Quinn, III ............... G01J 5/522 374/129 |
| 4,733,955 A | 3/1988 | Cook |
| 4,779,984 A | 10/1988 | Cook |
| 4,824,243 A | 4/1989 | Wheeler et al. |
| 4,826,287 A | 5/1989 | Cook et al. |
| 4,834,517 A | 5/1989 | Cook |
| 4,834,537 A | 5/1989 | Rafanelli et al. |
| 4,964,706 A | 10/1990 | Cook |
| 4,993,818 A | 2/1991 | Cook |
| 5,009,494 A | 4/1991 | Iossi et al. |
| 5,035,474 A | 7/1991 | Moss et al. |
| 5,068,750 A | 11/1991 | Cook et al. |
| 5,078,502 A | 1/1992 | Cook |
| 5,080,483 A | 1/1992 | Cook |
| 5,170,284 A | 12/1992 | Cook |
| 5,173,801 A | 12/1992 | Cook |
| 5,221,990 A | 6/1993 | Cook |
| 5,229,880 A | 7/1993 | Spencer et al. |
| 5,260,767 A | 11/1993 | Cook |

(Continued)

*Primary Examiner* — David P Porta
*Assistant Examiner* — Shun Lee
(74) *Attorney, Agent, or Firm* — Daly Crowley Mofford & Durkee, LLP

(57) ABSTRACT

Methods and apparatus for sensor calibration of a system having an aperture, primary mirror, secondary mirror, and a sensor, such as an FPA IR sensor. A calibration system includes calibration energy sources with a movable first mirror configured to be selectively inserted into the optical path and select one of the calibration energy sources and a second mirror configured to image the selected calibration energy source.

18 Claims, 9 Drawing Sheets

(56) References Cited

U.S. PATENT DOCUMENTS

| | | |
|---|---|---|
| 5,331,470 A | 7/1994 | Cook |
| 5,347,391 A | 9/1994 | Cook et al. |
| 5,386,316 A | 1/1995 | Cook |
| 5,477,395 A | 12/1995 | Cook |
| 5,526,181 A | 6/1996 | Kunick et al. |
| 5,661,610 A * | 8/1997 | Pasternak .......... G02B 17/0631 359/859 |
| 5,705,811 A * | 1/1998 | Harder ................ G01N 21/274 250/232 |
| 5,729,016 A | 3/1998 | Klapper et al. |
| 5,763,882 A | 6/1998 | Klapper et al. |
| 5,831,762 A | 11/1998 | Baker et al. |
| 5,847,879 A | 12/1998 | Cook |
| 6,016,220 A | 1/2000 | Cook |
| 6,018,424 A | 1/2000 | Morgan et al. |
| 6,020,994 A | 2/2000 | Cook |
| 6,084,727 A | 7/2000 | Cook |
| 6,122,051 A | 9/2000 | Ansley et al. |
| 6,178,047 B1 | 1/2001 | Cook |
| 6,700,699 B1 | 3/2004 | Cook |
| 6,767,103 B2 | 7/2004 | Cook |
| 6,792,028 B2 | 9/2004 | Cook et al. |
| 6,833,547 B2 | 12/2004 | Patience et al. |
| 6,886,953 B2 | 5/2005 | Cook |
| 6,902,282 B2 | 6/2005 | Cook |
| 6,919,988 B2 | 7/2005 | Cook |
| 6,989,537 B2 | 1/2006 | Cook |
| 7,045,774 B2 | 5/2006 | Wheeler et al. |
| 7,080,912 B2 | 7/2006 | Cook |
| 7,099,077 B2 | 8/2006 | Cook |
| 7,218,444 B2 | 5/2007 | Cook |
| 7,382,498 B1 | 6/2008 | Cook |
| 7,433,120 B2 | 10/2008 | Cook |
| 7,556,389 B2 | 7/2009 | Cook |
| 7,589,896 B2 | 9/2009 | Cook et al. |
| 7,592,588 B2 | 9/2009 | Moskun et al. |
| 7,648,249 B2 | 1/2010 | Cook |
| 7,703,932 B2 | 4/2010 | Cook |
| 7,763,857 B2 | 7/2010 | Cook |
| 7,813,644 B2 | 10/2010 | Chen et al. |
| 7,933,067 B1 | 4/2011 | Cook |
| 8,023,183 B1 | 9/2011 | Cook |
| 8,102,583 B2 | 1/2012 | Cook |
| 8,123,371 B2 | 2/2012 | Cook |
| 8,186,628 B2 | 5/2012 | Gooden et al. |
| 8,248,693 B2 | 8/2012 | Cook |
| 8,274,734 B2 | 9/2012 | Cook |
| 8,277,060 B2 | 10/2012 | Cook |
| 8,279,520 B2 | 10/2012 | Moskun et al. |
| 8,294,988 B2 | 10/2012 | Cook |
| 8,334,975 B1 | 12/2012 | Cook |
| 8,411,268 B2 | 4/2013 | Cook et al. |
| 8,416,407 B2 | 4/2013 | Cook |
| 8,422,011 B2 | 4/2013 | Cook et al. |
| 8,427,744 B2 | 4/2013 | Cook |
| 8,436,992 B2 | 5/2013 | Robinson et al. |
| 8,471,915 B2 | 6/2013 | Robinson et al. |
| 8,488,237 B2 | 7/2013 | Cook |
| 8,507,866 B2 | 8/2013 | Cook |
| 8,536,503 B2 | 9/2013 | Cook et al. |
| 8,714,760 B2 | 5/2014 | Cook |
| 8,759,735 B2 | 6/2014 | Cook et al. |
| 8,792,163 B2 | 7/2014 | King et al. |
| 8,801,202 B2 | 8/2014 | Cook |
| 8,824,055 B2 | 9/2014 | Cook |
| 8,902,498 B2 | 12/2014 | Cook |
| 8,964,047 B2 | 2/2015 | Robinson et al. |
| 9,024,253 B2 | 5/2015 | De Ruyter et al. |
| 9,025,256 B2 | 5/2015 | Cook |
| 9,030,660 B2 | 5/2015 | Silny et al. |
| 9,110,276 B2 | 8/2015 | Cook |
| 9,121,758 B2 | 9/2015 | Cook |
| 9,166,686 B2 | 10/2015 | Cook |
| 9,291,501 B2 | 3/2016 | Robinson et al. |
| 9,348,126 B2 | 5/2016 | Cook |
| 9,354,116 B1 | 5/2016 | Cook |
| 9,404,792 B2 | 8/2016 | Shimon et al. |
| 9,411,137 B2 | 8/2016 | Cook |
| 9,500,518 B2 | 11/2016 | Cook |
| 9,565,372 B2 | 2/2017 | Cook |
| 10,054,774 B2 | 8/2018 | Cook |
| 10,168,209 B2 | 1/2019 | Spencer et al. |
| 10,185,133 B1 | 1/2019 | Cook |
| 10,345,562 B2 | 7/2019 | Cook et al. |
| 10,509,210 B2 | 12/2019 | Cook |
| 10,520,437 B1 | 12/2019 | Stebbins et al. |
| 10,670,841 B2 | 6/2020 | Cook |
| 2016/0041033 A1 * | 2/2016 | Oskotsky .............. G01J 3/0208 356/328 |

\* cited by examiner

RADIOMETRIC CALIBRATION OF DETECTOR

FIELD

The present disclosure relates to calibration. More particularly, the present disclosure relates to calibration of imaging systems.

BACKGROUND

Some types of conventional detectors responsive to electromagnetic radiation generally include an array of pixels that generate current in response to electromagnetic energy incident upon the pixel. The generated current may be proportional to the incident energy. The pixels may be prone to some fluctuation in their response behavior over the life of the detector. An unknown change in performance of the detector could lead to erroneous data regarding measurements of an electromagnetic energy source. Accordingly, regular calibration is desirable to ensure uniformity in measurements. By determining the relative operating performance, calibration is used to correct for pixel to pixel variations (non-uniformity correction) and to correct for changes in the pixel response over time.

Conventional techniques for calibration include placing one or more known energy sources at or near the detector, or at an optically conjugate location, to illuminate the detector. Although calibration in a laboratory environment is typically performed before deployment, regular re-calibration after deployment may be desired to accommodate for changes in pixel response over time.

As detector assemblies of this type are frequently used in space-based imaging devices, a complex calibration system is undesirable. Size and weight are factors in the cost of assembly and launch of these space-based devices. Generally, an increase in size and weight of one component affects the size and weight of the remaining components. Further, the calibration system is typically designed to withstand the forces encountered during launch and deployment and then repeated operation requests without being easily serviceable. There are also a number of existing elements that are desired for detector functionality, such as spectral filter wheels and guidance systems.

SUMMARY

Embodiments of the disclosure provide methods and apparatus for calibration of a detector system. In some embodiments, an infrared (IR) focal plane array (FPA) of a detector system is configured to view multiple black bodies at selected times for radiometric calibration. To effect calibration, a device, such as a movable mirror, is inserted temporarily into an imaging path, and a further device, such as a fixed mirror, images the FPA onto one or more black body apertures. In embodiments, the movable mirror also switches the FPA image onto multiple black body apertures. In example embodiments, calibration is achieved with one mechanism and two mirrors, one of which is movable, to view three known black body sources.

In embodiments, calibration is performed by inserting a movable mirror into an imaging path and using a fixed mirror for FPA imaging multiple blackbody apertures. A stow position of the moveable mirror may be performed by the same mechanism for insertion and black body selection.

In one aspect, a system comprises: an aperture to collect energy for detection by a sensor; a primary optical element to reflect the collected energy; a secondary optical element to reflect energy from the primary optical element to the sensor, wherein an optical path extends from the primary optical element to the sensor; and a calibration system, comprising: first and second calibration energy sources; a movable first mirror configured to be selectively inserted into the optical path between the secondary optical element and an intermediate image during calibration, wherein the first mirror is closer to the intermediate image than the secondary optical element; and a second mirror configured to image the first one of the first and second calibration energy sources, wherein the first mirror is configured to have a stowed position not in the optical path during non-calibration of the system, a first position to select the first calibration energy source and a second position to select the second calibration energy source.

A system can further comprise one or more of the following features: the second mirror has a fixed position, a tertiary mirror and an exit pupil in the optical path to form an image on the sensor, the sensor comprises a focal plane array (FPA), the sensor comprises an infrared (IR) sensor, a third calibration energy source, wherein the first mirror is further configured to have a third position to select the third calibration energy source, the first, second, and third calibration energy sources each have different defined energy characteristics, a calibration module configured to position the first mirror, and/or the system forms part of a satellite.

In another aspect, a method comprises: calibrating a sensor system that comprises: an aperture to collect energy for detection by a sensor; a primary optical element to reflect the collected energy; a secondary optical element to reflect energy from the primary optical element to the sensor, wherein an optical path extends from the primary optical element to the sensor; and wherein calibrating the sensor system comprises: employing first and second calibration energy sources during calibration; inserting a movable first mirror into the optical path between the secondary optical element and an intermediate image during calibration of the sensor to select a first one of the first and second calibration energy sources, wherein the first mirror is closer to the intermediate image than the secondary optical element; and imaging, using a second mirror, the first one of the first and second calibration energy sources, wherein the first mirror is configured to have a stowed position not in the optical path during non-calibration of the system, a first position to select the first calibration energy source and a second position to select the second calibration energy source.

A method can further include one or more of the following features: the second mirror has a fixed position, the sensor system further includes a tertiary mirror and an exit pupil to form an image on the sensor, the sensor comprises a focal plane array (FPA), the sensor comprises an infrared (IR) sensor, employing a third calibration energy source, wherein the first mirror is further configured to have a third position to select the third calibration energy source, the first, second, and third calibration energy sources each have different defined energy characteristics, employing a calibration module to position the first mirror, and/or system forms part of a satellite.

BRIEF DESCRIPTION OF THE DRAWINGS

The foregoing features of this disclosure, as well as the disclosure itself, may be more fully understood from the following description of the drawings in which.

DETAILED DESCRIPTION

Figure 1:
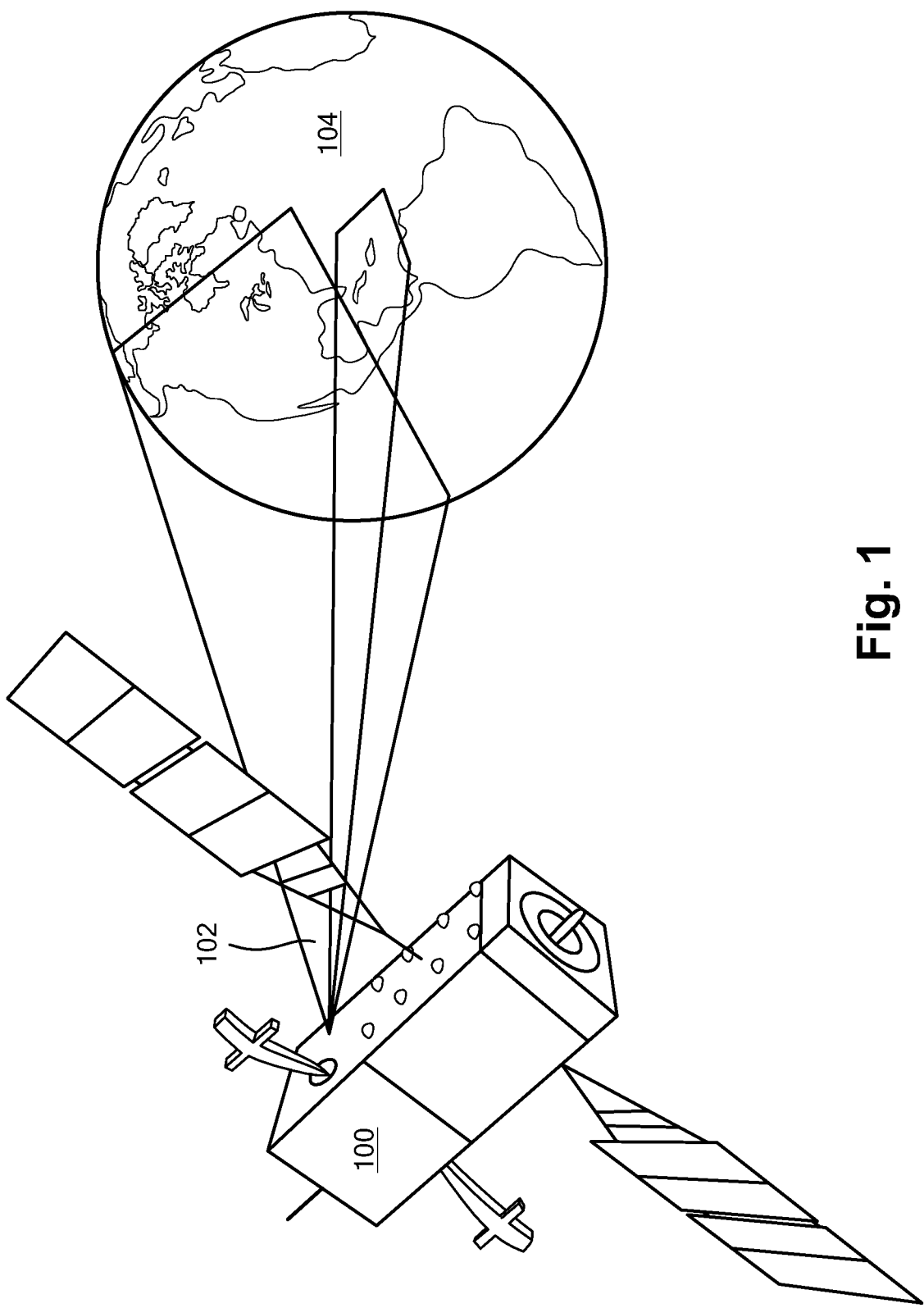
FIG. 1 shows a notional example space vehicle including an imaging system having an infrared (IR) detector system that can be calibrated in accordance with illustrative embodiments of the disclosure.

FIG. 1 shows an example space vehicle 100 including an imaging system 102 having infrared (IR) detector system with multiple fields of view (FOVs) directed at the Earth 104. The detector system can be configured for a wide range of frequencies to meet the needs of a particular application, such as weather, observation, communication, astronomical, reconnaissance, navigational, etc. Example detector systems can be configured for a variety of space vehicles including satellites, spaceships, high-altitude aircraft, and the like. As described more fully below, example detector systems 104 can be calibrated from time to time to ensure accurate information is generated.

In embodiments, calibration of a radiometer is performed. As used herein, a radiometer refers to a device for measuring the power, which can be considered radiant flux, of received electromagnetic radiation. In example embodiments, a radiometer is configured to measure infrared radiation. In other embodiments, ultraviolet light, microwave wavelengths, and the like can be measured.

It is understood that calibration can refer to relative calibration and absolute calibration. Absolute calibration refers to calibration to enable the sensor to determine the absolute value of a parameter, such as absolute temperature. Relative calibration refers to calibration of internal non-uniformity. For example, an FPA may have pixel-to-pixel variance that can change over time. A blackbody, for example, may be used to calibrate for pixel-to-pixel adjustments when processing sensor data. A blackbody, which has known characteristics, can also be used for absolute calibration. It is understood that blackbodies may be precisely defined in accordance with industry standards.

In embodiments, a calibration system enables calibration of one or more FPAs that form part of an imaging sensor by selectively, e.g., periodically, allowing the FPA(s) to view one or more blackbody (BB) reference sources for radiometric calibration purposes. Calibration can include an optical element, such as a mirror, insertable into the nominal imaging path. It is understood that this calibration optical element is not normally present in the optical path because it blocks the scene to be imaged. When inserted in the nominal imaging path, the optical element allows the FPA(s) to view the BB sources. This can be considered an insert function.

An imaging function can utilize an optical element that images the FPA(s) onto the BB aperture(s). A select function can utilize an optical element to allow the FPA(s) to sequentially view multiple BB sources, such as a 'cold' BB, a 'hot' BB, and a 'medium' or variable temperature BB. The insert function, the imaging function, and the select function are achieved using a number of optical elements some of which may move, as described more fully below. Embodiments of the disclosure provide a calibration configuration where a moving first mirror performs both the insert and select functions and a stationary second mirror performs the imaging function.

Figure 2:
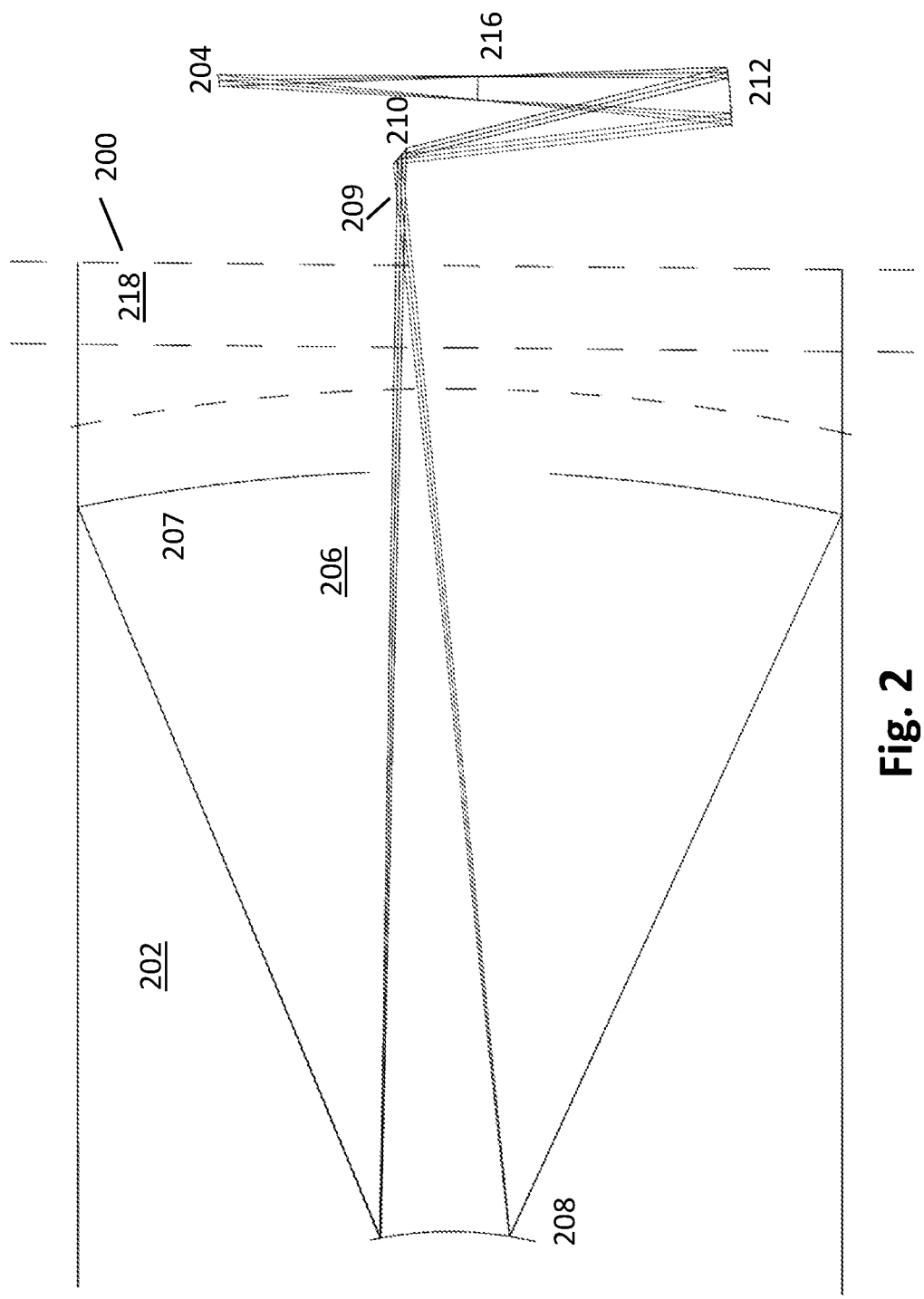
FIG. 2 is a schematic representation of an example sensor system that can be calibrated in accordance with example embodiments of the disclosure.

FIG. 2 shows an example imaging system 200 including a system 202 having a focal plane array (FPA) 204. The imaging system 200 can be calibrated using a movable mirror and a fixed mirror, as described more fully below. The example embodiment of FIG. 2 comprises a three-mirror anastigmat, i.e., the system is corrected for spherical aberration, coma, and astigmatism. The imaging system 200 includes an aperture 206 for receiving light energy that is reflected by a primary mirror 207 to a secondary mirror 208 and mirror 210. The primary and secondary mirrors 207, 208 form an intermediate image 209. A tertiary mirror 212 reflects light from mirror 210 to an FPA 214. In embodiments, the portion of the optical system back (in front) of an exit pupil 216 is temperature controlled, e.g., cooled to a selected temperature, in order to minimize interfering heat energy from degrading (distorting) an image on the FPA.

In embodiments, the system 200 is supported by any suitable structure, such as various configurations of an aft mounting structure 218.

The FPA 204 can comprise any practical size with any practical type of pixel sensor to meet the needs of a particular application.

Figure 3:
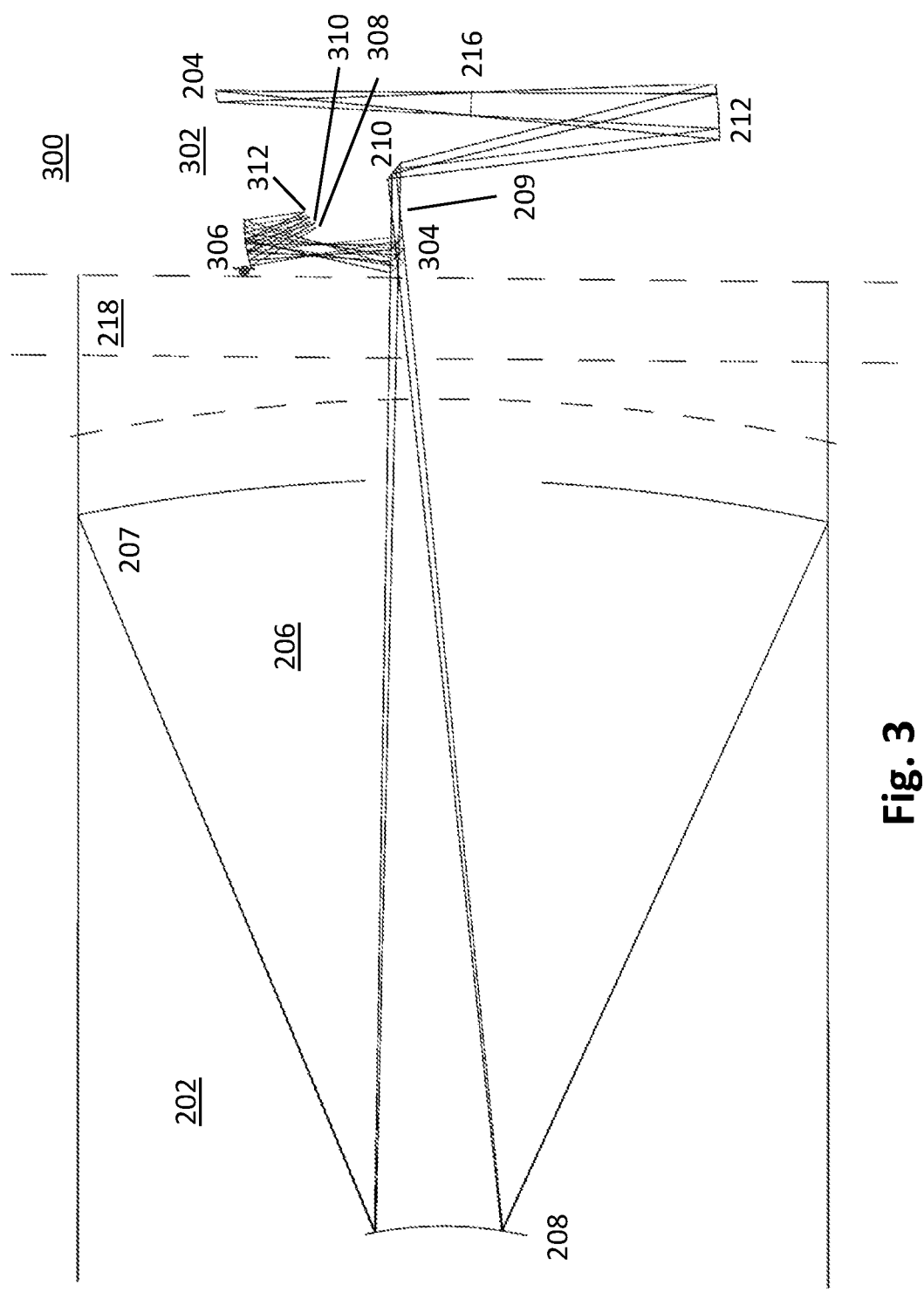
FIG. 3 shows the sensor system of FIG. 2 with an illustrative calibration system in accordance with example embodiments of the disclosure.

FIG. 3 shows an example three-mirror anastigmat imaging system 300 having a calibration system 302. In the illustrated embodiment, the calibration system 302 is added to the sensor system of FIG. 2. In example embodiments, the calibration system 302 includes a first mirror 304 and a second mirror 306. In embodiments, the first mirror 304 is movable and the second mirror 306 is fixed. The first and second mirrors 304, 306 are configured to calibrate the system using multiple known blackbody (BB) sources shown as 308, 310, 312. As described more fully below, the first mirror 304 may be inserted into the optical path in different positions to sequentially image one of blackbody sources 308, 310, 312.

As is understood by one of ordinary skill in the art, the blackbody sources 308, 310, 312 radiate energy in a known pattern in order to enable calibration of a sensor, such as a FPA. For example, the blackbody sources 308, 310, 312 may comprise a 'hot' source of energy, a 'cold' source of energy, and a 'medium' source of energy. The source of energy can radiate photons, for example, at known rate which can be used for calibration. In embodiments, the blackbody sources 308, 310, 312 are located in a fixed position in relation to the second mirror 306. It is understood that the radiated energy patterns of the blackbody sources can be selected to meet the needs of a particular application. It is understood that each blackbody source may have a respective aperture so that only energy from the selected aperture is detected by the FPA 204.

In example embodiments, the calibration path uses a moving mirror (single axis), e.g., the first mirror 304, that both inserts and selects which of the blackbodies 308, 310, 312 is to be viewed. A fixed powered mirror, e.g., the second mirror 306, performs the imaging function onto the black body apertures.

Figure 3A:
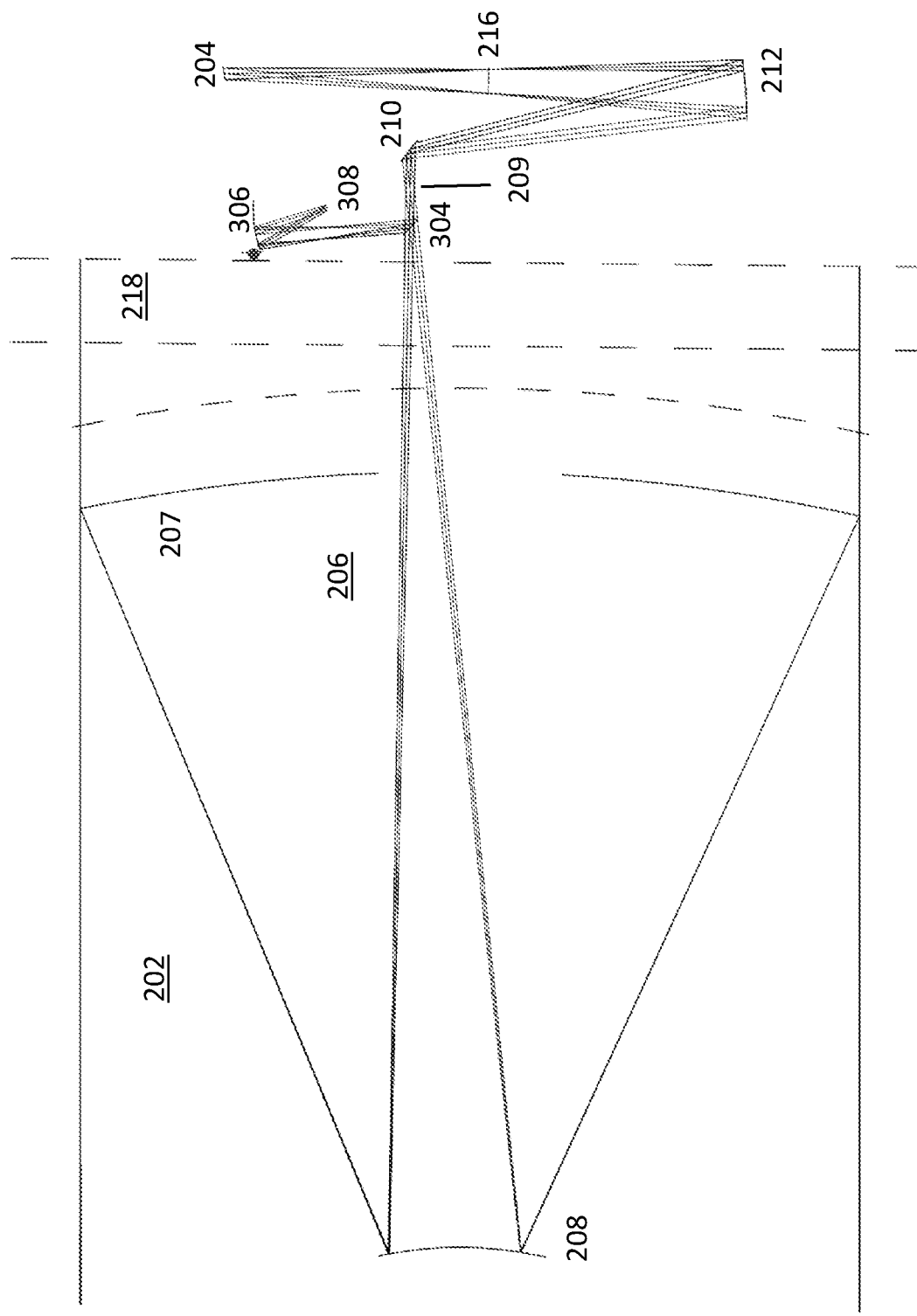
FIG. 3A shows the calibration system of FIG. 3 configured to image a first blackbody energy source.
Figure 3B:
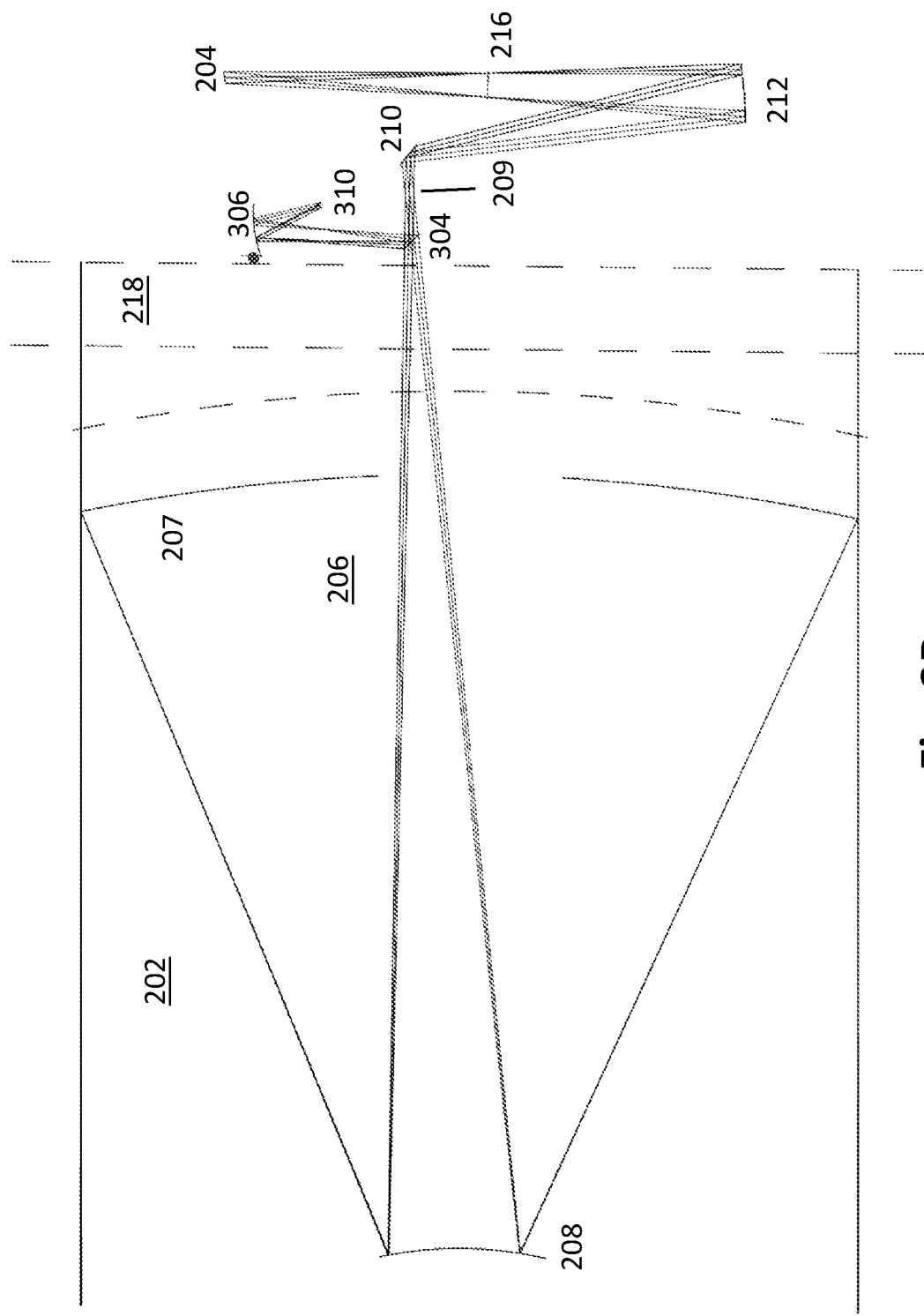
FIG. 3B shows the calibration system of FIG. 3 configured to image a second blackbody energy source.
Figure 3C:
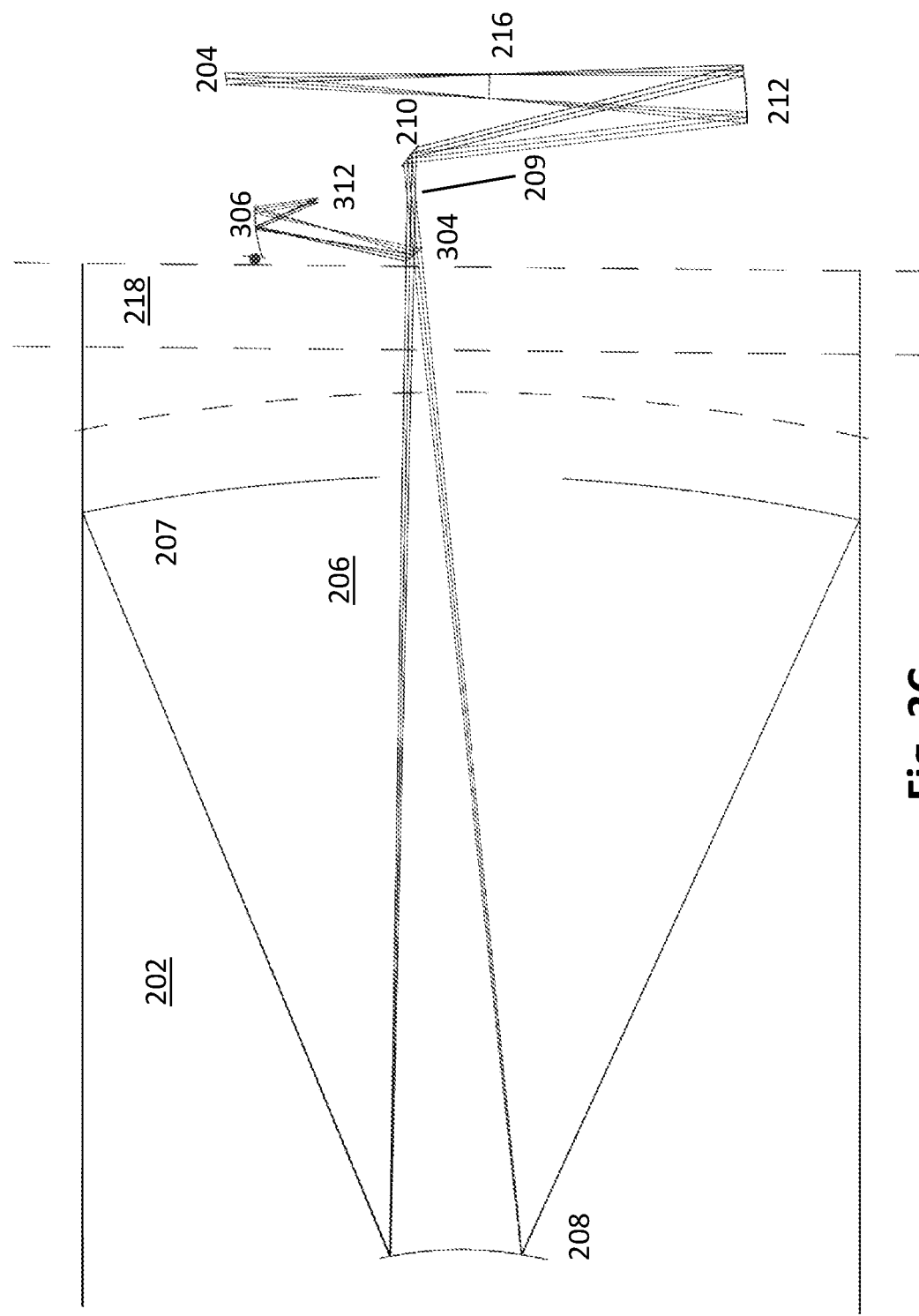
FIG. 3C shows the calibration system of FIG. 3 configured to image a third blackbody energy source.

FIGS. 3A, 3B, and 3C show radiometric calibration using each of the blackbodies 308, 310, 312. FIG. 3A shows the first mirror 304 inserted into the optical path between the secondary mirror 208 and the intermediate image 209 at a first position to image the first blackbody 308 onto the FPA 204. More particularly, the movable first mirror 304 is positioned in relation to the fixed second mirror 306 and the first blackbody 308 to image the first blackbody 308 on the FPA 204. Since the first blackbody 308 has a known energy signature, the system can be calibrated using this information.

FIG. 3B shows the first mirror 304 in a second position in the optical path to image the second blackbody 310 onto the FPA 204. FIG. 3C shows the first mirror 304 in a third position to image the third blackbody 312 onto the FPA 204. The energy signature of the first, second and third blackbodies 308, 310, 312 can used for radiometric calibration of the sensor. It is understood that using known information to calibrate a sensor is well within the ordinary skill in the relevant art.

It is understood that each blackbody source of energy should provide a known amount of energy. In embodiments, each blackbody can include an aperture to (for) provide a known energy signature as each blackbody is sequentially imaged onto the FPA. An example sensor calibration system using blackbody reference sources is shown and described in U.S. Pat. No. 9,024,253, which is incorporated herein by reference.

As compared to known calibration systems, example embodiments allow greater latitude in the location of the movable insert mirror. That is, the mirror does not need to be relatively close to the (intermediate image) reimaged pupil 216 location as required in some conventional systems.

Figure 4:
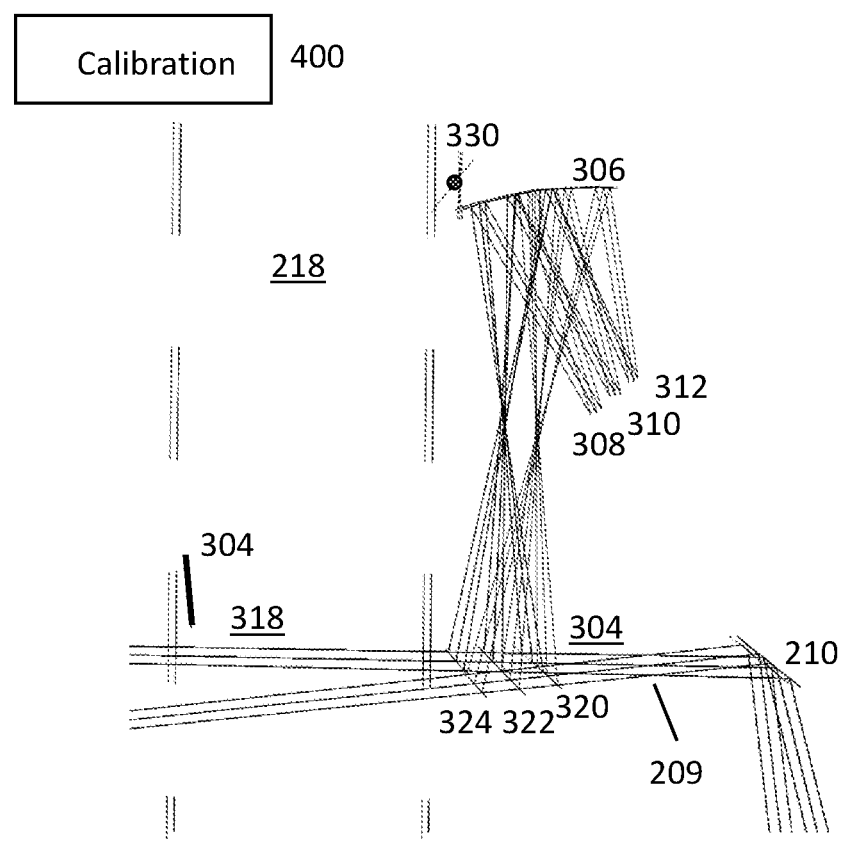
FIG. 4 is a schematic representation showing further detail of the calibration system of FIG. 3 with a movable mirror in a stowed position and the positions of FIGS. 3A-C.

FIG. 4 shows further detail for the system 300 of FIG. 3. In an example embodiment, the first mirror 304 can move from a stowed position 318 to one of first, second, and third positions 320, 322, 324, each of which corresponds to selecting a particular one of the blackbodies 308, 310, 312 for imaging by the second mirror 306. In the illustrated embodiment, the first position 320 for the first mirror 304 corresponds to imaging the first blackbody 308, the second position 322 corresponds to imaging the second blackbody 310, and the third position 324 corresponds to imaging the third blackbody 312.

In an example embodiment, the first mirror 304 can move about a pivot axis 330. With this arrangement, the first mirror 304 can move to the right from the stowed position 318 on left side of the page to one of the calibration positions 320, 322, 324 to select one of the blackbodies 308, 310, 312.

The system can include a calibration module 400 to control overall calibration of the system. For example, the calibration module 400 can position the first mirror 304 to a given (position) location for imaging a desired blackbody, as described more fully above. As noted above, the timing, sequence, and interval for sensor calibration can be controlled and implemented by the calibration control module 400. In embodiments, the calibration module 400 can collect and process data collected from the blackbodies and calibrate the sensor for accurate measurements during normal operation of the system. In some embodiments, the calibration module 400 can include a processor and memory. It is understood that the calibration module 400 can be implemented in any combination of hardware and software and can include any suitable circuitry to enable the module to perform desired functionality.

It is understood that any suitable mechanism can be used to position the first mirror 304 from the stowed position to a desired location to effect calibration in a selected sequence.

An attached Appendix shows a readable ASCI file with a raytrace prescription for an example embodiment of the disclosure, such as that shown and described above.

Figure 5:
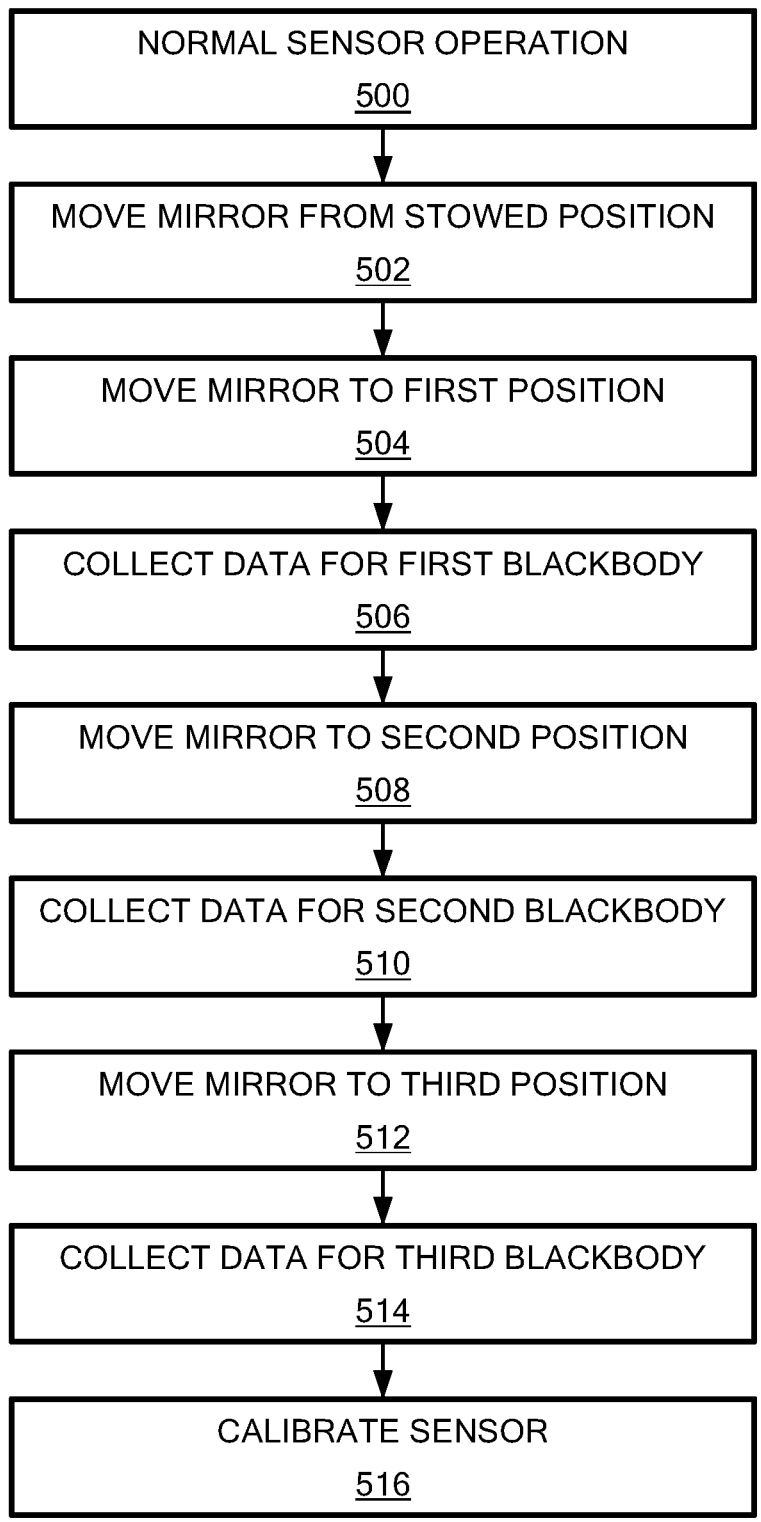
FIG. 5 is a flow diagram showing an example sequence of steps for sensor calibration in accordance with example embodiments of the disclosure.

FIG. 5 shows an example sequence of steps for radiometric sensor calibration in accordance with example embodiments of the disclosure. In step 500, sensor system is operating in a normal imaging state with a path from the aperture to a sensor, such as an FPA. In step 502, a first mirror is moved from a stowed position. In step 504, the first mirror is manipulated to a first position to image a first blackbody. In step 506, energy from the first blackbody is collected at the sensor. In step 508, the first mirror is manipulated to a second position to image a second blackbody. In step 510, energy from the second blackbody is collected at the sensor. In step 512, the first mirror is manipulated to a third position to image a third blackbody. In step 514, energy from the first blackbody is collected at the sensor. In step 516, the energy signatures collected from the blackbody sources are used to calibrate the sensor.

It is understood that any practical number and type of blackbody energy sources can be used in any order. It is further understood that calibration can be performed after each blackbody image collection.

Figure 6:
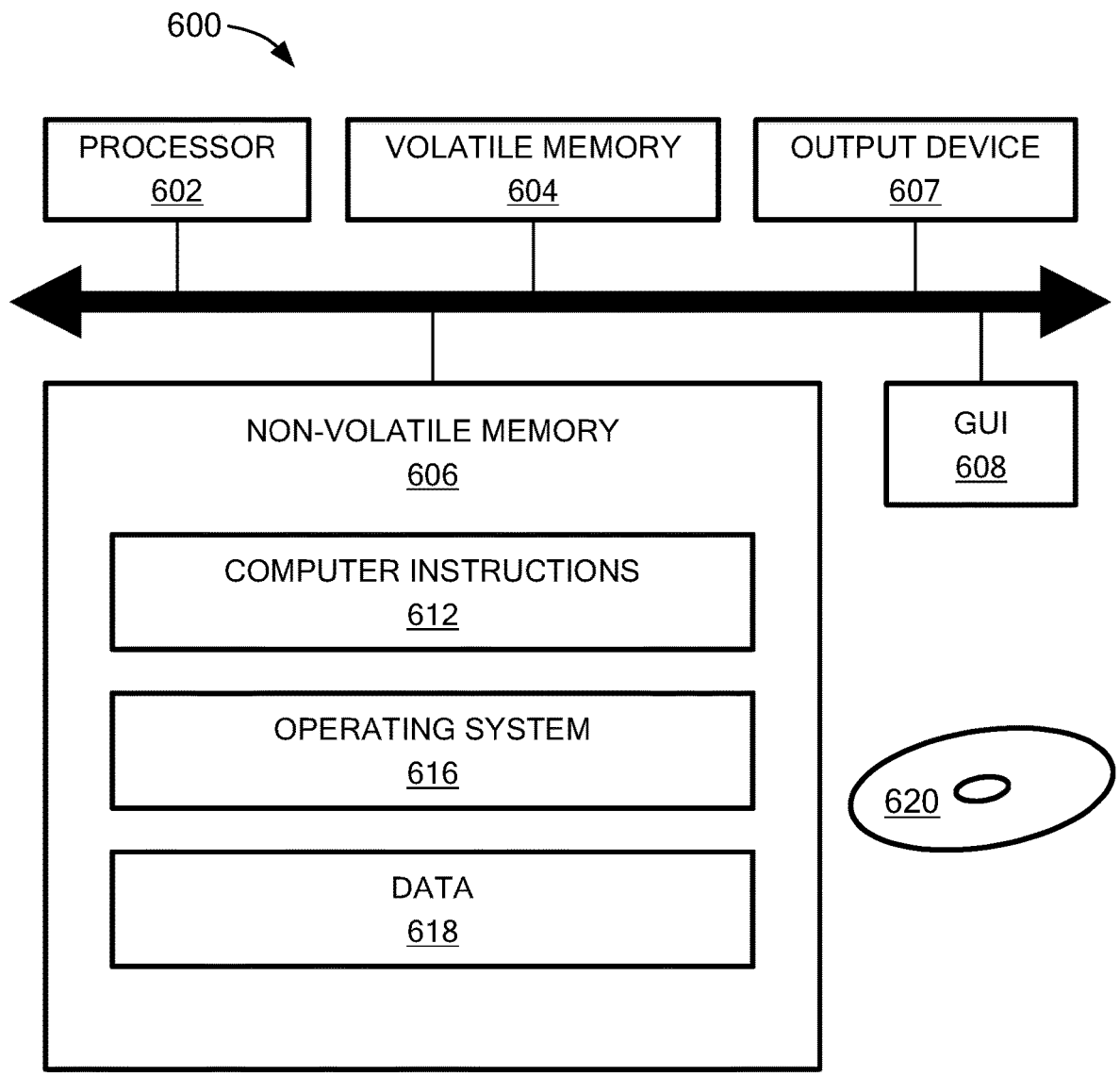
FIG. 6 is a schematic representation of an example computer that can perform at least a portion of the processing described herein.

FIG. 6 shows an exemplary computer 600 that can perform at least part of the processing described herein, such as the processing 500 (FIG. 5) performed by the calibration module 400 (FIG. 4). For example, the computer 600 can perform processing to generate signals to configure circuit elements in the first, second, and/or third layers. The computer 600 includes a processor 602, a volatile memory 604, a non-volatile memory 606 (e.g., hard disk), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A system, comprising:
    an aperture to collect energy for detection by a sensor;
    a primary optical element to reflect the collected energy;
    a secondary optical element to reflect energy from the primary optical element to the sensor, wherein an optical path extends from the primary optical element to the sensor; and
    a calibration system, comprising:
        first and second calibration energy sources;
        a movable first mirror configured to be selectively inserted into the optical path between the secondary optical element and an intermediate image during calibration, wherein the first mirror is closer to the intermediate image than the secondary optical element; and
        a second mirror configured to image a first-one of the first and second calibration energy sources,
    wherein the first mirror is configured to have a stowed position not in the optical path during non-calibration of the system, a first position to select the first calibration energy source and a second position to select the second calibration energy source.

2. The system according to claim 1, wherein the second mirror has a fixed position.

3. The system according to claim 1, further including a tertiary mirror and an exit pupil in the optical path to form an image on the sensor.

4. The system according to claim 3, wherein the sensor comprises a focal plane array (FPA).

5. The system according to claim 4, wherein the sensor comprises an infrared (IR) sensor.

6. The system according to claim 1, further including a third calibration energy source, wherein the first mirror is further configured to have a third position to select the third calibration energy source.

7. The system according to claim 6, wherein the first, second, and third calibration energy sources each have different defined energy characteristics.

8. The system according to claim 1, further including a calibration module configured to position the first mirror.

9. The system according to claim 1, wherein the system forms part of a satellite.

10. A method, comprising:
    calibrating a sensor system that comprises:
        an aperture to collect energy for detection by a sensor;
        a primary optical element to reflect the collected energy;
        a secondary optical element to reflect energy from the primary optical element to the sensor, wherein an optical path extends from the primary optical element to the sensor; and
    wherein calibrating the sensor system comprises:
        employing first and second calibration energy sources during calibration;
        inserting a movable first mirror into the optical path between the secondary optical element and an intermediate image during calibration of the sensor to select a first one of the first and second calibration energy sources, wherein the first mirror is closer to the intermediate image than the secondary optical element; and
        imaging, using a second mirror, the first one of the first and second calibration energy sources,
    wherein the first mirror is configured to have a stowed position not in the optical path during non-calibration of the system, a first position to select the first calibration energy source and a second position to select the second calibration energy source.

11. The method according to claim 10, wherein the second mirror has a fixed position.

12. The method according to claim 10, wherein the sensor system further includes a tertiary mirror and an exit pupil to form an image on the sensor.

13. The method according to claim 12, wherein the sensor comprises a focal plane array (FPA).

14. The method according to claim 10, wherein the sensor comprises an infrared (IR) sensor.

15. The method according to claim 10, further including employing a third calibration energy source, wherein the first mirror is further configured to have a third position to select the third calibration energy source.

16. The method according to claim 15, wherein the first, second, and third calibration energy sources each have different defined energy characteristics.

17. The method according to claim 10, further including employing a calibration module to position the first mirror.

18. The method according to claim 10, wherein the system forms part of a satellite.

* * * * *